April 3, 1962  R. F. NORRICK  3,028,170
CHUCK MECHANISM
Filed Feb. 18, 1960
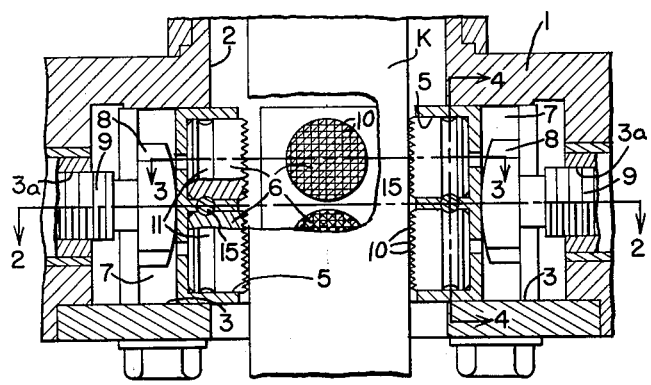
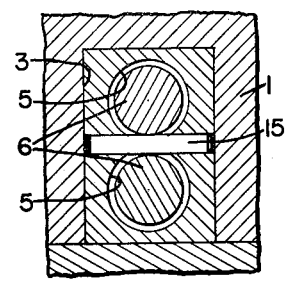
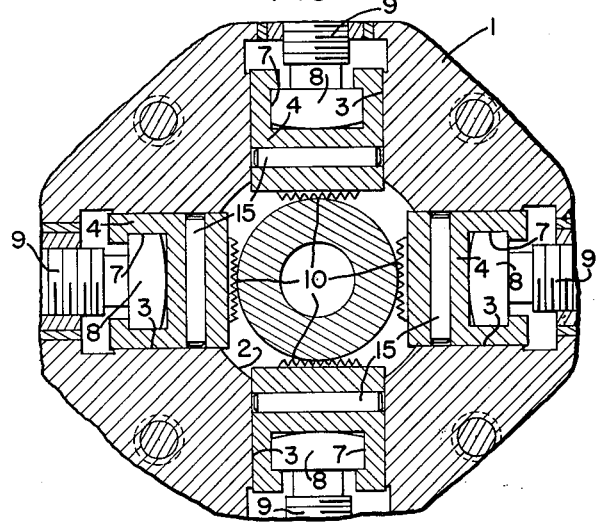
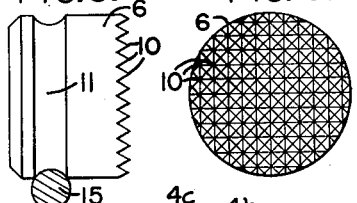
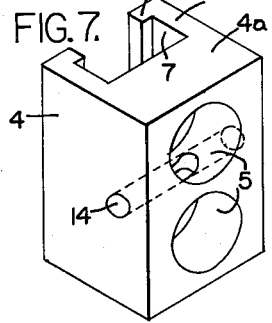
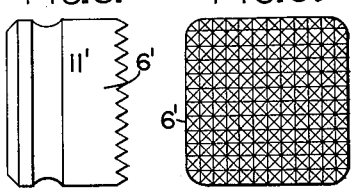
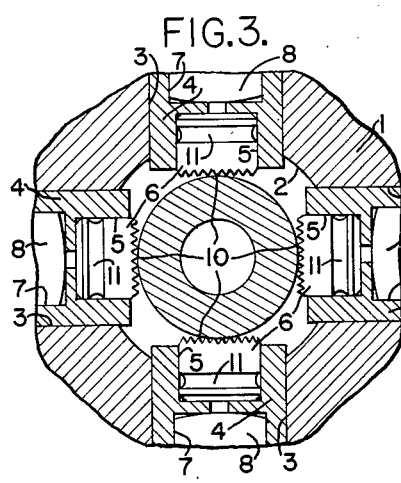
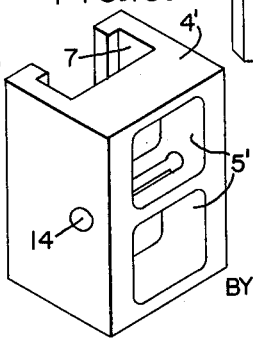
INVENTOR:
ROBERT F. NORRICK
BY Joseph Januszkiewicz
ATTORNEY United States Patent Office 3,028,170
Patented Apr. 3, 1962

3,028,170
CHUCK MECHANISM
Robert F. Norrick, Michigan City, Ind., assignor to Joy Manufacturing Company, Pittsburgh, Pa., a corporation of Pennsylvania
Filed Feb. 18, 1960, Ser. No. 9,530
8 Claims. (Cl. 279—123)

This invention relates to chuck mechanisms and more particularly to improved gripping jaw devices for a chuck mechanism for an oil well drill rig.

In oil well drilling, a conventional drill rig is employed for driving a round kelly attached to the drill string. In addition a chuck mechanism is provided for gripping the round kelly so that the kelly can be connected to a feeding and rotating mechanism. With the presently known chuck mechanisms the chuck jaw thereof often becomes worn upon use and must frequently be reconditioned or replaced. The present invention contemplates improvements over known types of chucks in that the chuck jaws have serrated gripping faces and are adjustably maintained in their operating positions by a roll pin. In the present invention, the chuck jaws are in the form of hard metal inserts mounted in the bores of a chuck and are freely rotatable in their respective bores to permit easy replacement of the inserts. Although the inserts are non-oriented they have serrated gripping faces which permit the inserts to grip in any of their relative rotational positions.

Accordingly, one object of this invention is to provide a new and improved means for retaining chuck jaw mechanisms.

Another object of this invention is to provide a new and improved adjustable position chuck jaw devices with a quick release means for permitting such adjustment.

A specific object of this invention is to provide an improved serrated chuck jaw with improved mounting means whereby the jaws are retained in their operating position by means of a slidable keeper pin.

These and other objects of this invention will become more apparent upon consideration of the following detailed description of a preferred embodiment thereof when taken in conjunction with the following drawings, in which:

FIG. 1 is a vertical cross section of a chuck mechanism constructed in accordance with the principles of this invention having portions broken away and portions shown in elevation to more clearly illustrate the structure thereof;

FIG. 2 is a cross sectional view of the mechanism shown in FIG. 1 taken on the line 2—2 thereof;

FIG. 3 is a cross sectional view of a portion of the mechanism shown in FIG. 1 taken on line 3—3 thereof;

FIG. 4 is a cross sectional view of a portion of the mechansim shown in FIG. 1 taken on line 4—4 thereof, in which a jaw securing locking element is shown between a pair of chuck jaws;

FIG. 5 is a side view of one of the chuck jaw inserts;

FIG. 6 is a front view of a jaw insert shown in FIG. 5 looking towards the serrated gripping face;

FIG. 7 is a perspective view of a chuck jaw receiving block;

FIG. 8 is a side view of another form of chuck jaw inserts;

FIG. 9 is a front view of the chuck jaw insert shown in FIG. 8 looking toward the serrated gripping face;

FIG. 10 is a perspective view of a modified form of a chuck jaw receiving block for receiving the chuck jaw insert shown in FIGS. 8 and 9.

The present invention relates to a chuck mechanism (FIG. 1) which comprises a chuck body 1 as is well known in the art having a centrally located bore 2 extending therethrough. The chuck body 1 has a plurality of recesses 3 extending radially outwardly therethrough from the bore 2. Each recess 3 is substantially rectangular in shape adjacent the bore 2 and thereafter terminates into a threaded bore portion 3a of reduced size when compared with the main portion of the recess 3. The rectangular portions of the recesses 3 provide guideways in which jaws supporting blocks 4 (FIG. 7) are radially guided for rectilinear adjustment, respectively. Each jaw supporting block 4 is generally U-shaped in cross section having an elongated rectangular shaped bight portion 4a and rectangular arm portions 4b extending perpendicularly outwardly in the same direction from opposite sides of the bight portion 4a. As shown in FIG. 7 the ends of the arm portions 4b remote from the bight portion 4a are provided with integral inwardly extending flanged portions 4c to form a T-shaped recess 7 extending longitudinally through the block 4. In use the blocks 4 are located in the recesses 3 respectively, so that the bight portions 4a can project into the bore 2.

In order to suitably slidably guide the jaw supporting blocks 4 in the rectangular portion of the recesses 3 suitable screws 9 having T-shaped heads 8, respectively, are provided. As shown the threaded shanks of the screws 9 threadedly engage the threaded bore portions 3a of the recesses 3, and the T-shaped head portions 8 engage the T-shaped recesses 7 of the jaw supporting blocks 4, respectively. Upon rotation of a screw 9 the jaw supporting block 4 cooperable therewith is rectilinearly adjusted within the cooperable recess 3. The outer end of the threaded section of the screw 9 may have a hex head by which the screw 9 may be rotated for adjusting purposes. The outer end of the threaded portion of screw 9 may be provided with any suitable structure such as an Allen-head for receiving an Allen-wrench by which the screw 9 may be adjusted. Other suitable means may be used to actuate screws 9.

The bight portion 4a of each jaw supporting block 4 has a pair of longitudinally spaced parallel cylindrical bores 5 therein which extend through the bight portion 4a of the block 4. The cylindrical bores 5 extend from that portion of the block 4 that is exposed to the centrally located bore 2, through the bight portion 4a, to the T-shaped recess 7 of the jaw supporting block 4. The axes of the bores 5 of each block 4 are radially aligned with the axis of the bore 2. Each bight portion 4a of each jaw supporting block 4 has a cylindrical bore 14 extending therethrough the axis of which is perpendicular to the axes of the cylindrical bores 5. As shown, the bore 14 is spaced inwardly of the bight portion 4a of the block 4 towards the arm portions 4b and extends laterally through the bight portion 4a. The bore 14 is of a sufficient diameter so that the intermediate portion thereof communicates with both of the bores 5 in the block 4. When a cylindrical roll pin 15 is inserted into the cylindrical bore 14, the pin 15 extends partially into and across the opposed portions of the respective bores 5 of the jaw supporting block 4.

Slidably in the respective bores 5 are cylindrical jaw inserts 6 having one end surface 10 thereof serrated. Each jaw insert 6 is provided with a circumferentially annular groove 11 inwardly of the surface 10 of the axis of which extends perpendicularly to the axis of the cylindrical insert 6 and the bores 5. The groove 11 of each jaw insert 6 is located inwardly of the surface 10 so that when a portion of the groove 11 is substantially coaxial with the cylindrical bore 14 when the insert 6 is in its operating position with the serrated surface 10 thereof extending a short distance into the centrally located bore 2 of the chuck body 1. Each block 4 has a pair of spaced bores 5 with a bore 14 intersecting portions of both bores 5 as previously described. The jaw inserts 6 are placed in their respective bores 5 with their groove 11 coaxially with the cylindrical bore 14 so that when pin 15 is inserted in bore 14, pin 15 will be closely received in the grooves 11 of the pairs of spaced jaw inserts 6 to thereby securely lock the jaw inserts 6 to the block 4. It will be understood that the pin 15 is smaller in length than the length of bore 14 so that it would not interfere with the sliding of the block 4 in their respective recesses 3 of the chuck body 1. By locating a portion of the annular grooves 11 of the jaw inserts 6 substantially coaxial with the cylindrical bores 14 of a jaw supporting block 4, the insertion of a roll pin 15 into the bore 14 will retain the jaw inserts 6 in their respective bores 5 of the respective jaw supporting blocks 4. It will be noted that this means of retention will permit the jaw inserts 6 to be rotated within the bores 5 but will prevent their axial displacement with respect to the bores 5. When the jaw inserts 6 are to be replaced or reconditioned, the roll pin 15 is easily driven out of the encompassing bore 14 by suitable means to free inserts 6 in a block 4 to permit the convenient removal of the jaw inserts 6.

Thus the roll pin 15 provides a simple direct means for maintaining the inserts 6 in their respective bores 5 and also provides an economical means for securing the inserts in position. The roll pin 15 provides economical means for securing the jaw inserts under field conditions where dirt and foreign matters work their way into the respective bores 5 and bores 14.

The mode of operation thereof is self evident to one skilled in the art, however, in summation the following manner is used. Jaw inserts 6 are inserted in the respective bores 5 of the blocks 4 and secured in position by means of roll pin 15. Since the jaw inserts have a circumferential groove 11 the pin 15 as it is inserted in the blocks 4 enters the respective grooves 11 of the jaw inserts 6 in a block 4 to thereby prevent the axial displacement of the inserts 6 from their respective bores 5. The blocks 4 are then suitably guided in their respective recesses 3 in the chuck body 1 so that when a T-shaped head screw 9 engages the block 4 and rotatably engaged by screw threads in the chuck body, rotation of screw 9 will radially adjust the respective blocks 4 and their jaw inserts 6 with respect to the central bore 2 in the chuck body 1. As a kelly K is passed through the bore 2 of the chuck body 1, the radially inward adjustment of the respective blocks 4 will cause the respective jaw inserts 6 to grip the kelly K so that as the chuck mechanism is rotated the kelly K will rotate therewith.

A modified form of the invention (FIGS. 8, 9 and 10) has the jaw inserts 6' of square cross section with the bores 5' of the jaw supporting blocks 4' of a complementary square cross section. The square cross sectioned jaw inserts 6' have a groove 11' about the periphery thereof similarly to the grooving of the cylindrical jaw inserts 6. The square jaw inserts 6' are retained in their respective square bores 5' by a roll pin 15 that is inserted into a groove 14 that intersects the bores 5' in a similar manner as groove 14 intersects bores 5 of the jaw supporting block 4. Thus the pin 15 provides a facile means for securing the replaceable jaw inserts 6' in their operative position while restraining the inserts 6' from axial movement out of the block 4'. Since the inserts 6' are square, they are prevented from rotation, however, the inserts 6', can be removed and rotated 90° to present a different surface for gripping the kelly K.

While there is in this application specifically described two forms which the invention may assume in practice, it will be understood that these forms are shown for purposes of illustration and that the invention may be modified and embodied in various other forms without departing from the spirit and scope of the claims.

What I claim is:

1. In a chuck mechanism, a supporting block having circular bores disposed in adjacent parallelism, hard metal jaw inserts of circular formation fitted in said bores respectively, having serrated gripping faces, said inserts rotatably mounted in said bores, and a single retaining element carried by said block and having its inner portion extending between said inserts and engaging the latter to lock both said inserts against axial movement in said bores relative to said block while permitting their rotation to any position.

2. A chuck mechanism comprising a body member with a centrally located bore extending vertically therethrough, said body member having a pair of opposed recesses extending radially from said vertically extending bore, support blocks adjustably mounted in said recesses respectively to be movable laterally of said bore, each of said blocks having at least a pair of adjacent openings therein extending substantially radially from said bore inwardly of said block, jaw inserts mounted in said openings respectively, each of said blocks having a laterally extending bore therein which communicates with said openings therein, said jaw inserts having a peripheral groove with a portion of said groove registering with said laterally extending bore, means located in each of said laterally extending bores and cooperating with said peripheral grooves of said jaw inserts for retaining said jaw inserts in said openings, respectively.

3. A chuck mechanism comprising a body member with a centrally located bore extending vertically therethrough, said body member having a pair of opposed recesses extending radially from said vertical bore, support blocks adjustably mounted in said recesses respectively, each of said blocks having a surface coextensive with said vertical bore, each of said blocks having openings extending inwardly from said surface thereof, jaw inserts rotatably mounted in said openings respectively, and a pin in each of said blocks for retaining said jaw inserts in said openings while permitting said inserts to rotate.

4. A chuck mechanism as set forth in claim 3 wherein each of said inserts has an annular groove thereon, each of said annular grooves having a portion thereof coextensive with a recess in each of said blocks wherein said respective pins project into said recess and said annular groove.

5. A chuck mechanism comprising a body member with a centrally located bore therein, said body member having opposed pairs of radial guide recesses therein communicating with said bore, supporting blocks adjustably mounted in said recesses respectively, a plurality of jaw inserts rotatably mounted in each of said blocks, respectively, for movement along an axis that is parallel to said radial recesses, means for retaining said inserts in said blocks and restricting said inserts from axial movement while permitting their rotative movement at all times.

6. An adjustable chuck jaw comprising, a support having a pair of spaced parallel bores therein, chuck jaw inserts mounted in said bores respectively, and means slidably mounted in said support for intersection with said bores respectively for frictionally retaining said inserts in said support.

7. An adjustable chuck jaw comprising, a support having a pair of spaced parallel bores therein, chuck jaw inserts mounted in said bores respectively, means slidably mounted in said support for intersection with said bores respectively for frictionally retaining said inserts in said support wherein each of said jaw inserts is circumferentially grooved and said sliding means includes a cylindrical pin element in said support which engages the walls of said jaw insert groove to hold said insert in said support while permitting said insert to rotate.

8. A chuck mechanism comprising a body member having a centrally located bore extending therethrough, said body member having a plurality of recesses extending radially through said body member, support blocks adjustably mounted in said recesses respectively, each of said support blocks having a pair of spaced adjacent openings that extend into said support block wherein said openings extend substantially in the same direction as said recess that slidably guides said respective block, jaw inserts mounted in said openings respectively, each jaw insert having a groove therein, a bore in each block intersecting said pairs of openings respectively, a pin slidably mounted in each of said bores and cooperative with said groove of said respective jaw inserts for retaining said jaw inserts in position.

References Cited in the file of this patent
UNITED STATES PATENTS 2,919,925    Snyder _____ Jan. 5, 1960